US010482291B2

(12) United States Patent
Woodall

(10) Patent No.: US 10,482,291 B2
(45) Date of Patent: *Nov. 19, 2019

(54) SECURE FIELD-PROGRAMMABLE GATE ARRAY (FPGA) ARCHITECTURE

(71) Applicant: Raytheon Company, Waltham, MA (US)

(72) Inventor: Thomas R. Woodall, Valencia, CA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,005

(22) Filed: Jan. 17, 2018

(65) Prior Publication Data

US 2018/0157867 A1    Jun. 7, 2018

Related U.S. Application Data

(63) Continuation of application No. 13/967,400, filed on Aug. 15, 2013, now Pat. No. 9,911,010, which is a continuation of application No. 12/861,586, filed on Aug. 23, 2010, now Pat. No. 8,516,268.

(51) Int. Cl.
*G06F 21/76* (2013.01)

(52) U.S. Cl.
CPC .................................. *G06F 21/76* (2013.01)

(58) Field of Classification Search
CPC .............................. H04L 9/3271; G06F 21/76
See application file for complete search history.

(56) References Cited

U.S. PATENT DOCUMENTS

| 6,105,012 | A  | 8/2000 | Chang et al. |
| 7,162,644 | B1 | 1/2007 | Timberger |
| 7,197,647 | B1 | 3/2007 | Van Essen et al. |
| 7,203,842 | B2 | 4/2007 | Kean |
| 7,725,738 | B1 | 5/2010 | Langhammer et al. |

(Continued)

FOREIGN PATENT DOCUMENTS

| EP | 1124330 A1 | 8/2001 |
| EP | 2056231 A1 | 5/2009 |

(Continued)

OTHER PUBLICATIONS

A. Menezes et al., "Handbook of Applied Cryptography," 1996.*

(Continued)

*Primary Examiner* — Andrew C Georgandellis
(74) *Attorney, Agent, or Firm* — Daly Crowley Mofford & Durkee, LLP

(57) ABSTRACT

Method and systems using stateful encryption for non-bypassable FPGA configuration including receiving, at an FPGA, FPGA-configuration data comprising a cryptographic state to initialize a cryptographic state of the FPGA, and decrypting, at the FPGA, the FPGA-configuration data, wherein decrypting the FPGA-configuration data yields at least a second cryptographic state and decrypted FPGA-configuration data. Embodiments can include receiving, at the FPGA, a challenge message, processing, at the FPGA, the challenge message to yield at least a third cryptographic state and a response, and transmitting the response from the FPGA.

6 Claims, 2 Drawing Sheets

(56) References Cited

U.S. PATENT DOCUMENTS

Figure 1:
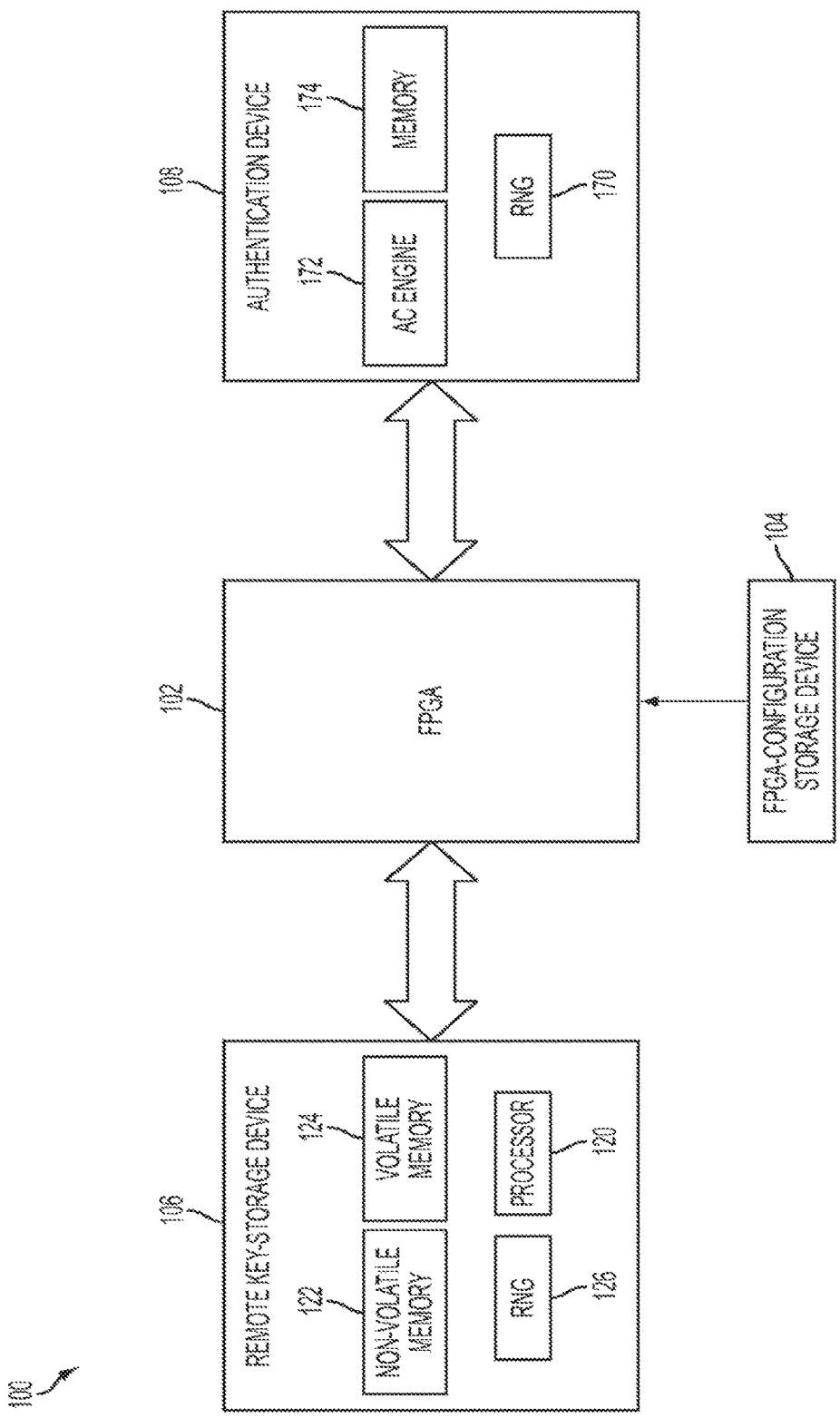

| | | | |
|---|---|---|---|
| 7,827,408 B1* | 11/2010 | Gehringer | H04L 9/0631 380/259 |
| 7,971,072 B1* | 6/2011 | Donlin | H04L 9/14 380/45 |
| 8,516,268 B2 | 8/2013 | Woodall | |
| 9,911,010 B2 | 3/2018 | Woodall | |
| 2001/0015919 A1 | 8/2001 | Kean | |
| 2006/0036857 A1 | 2/2006 | Hwang | |
| 2007/0074045 A1 | 3/2007 | Van Essen et al. | |
| 2007/0081667 A1* | 4/2007 | Hwang | H04L 9/3271 380/30 |
| 2007/0204170 A1 | 8/2007 | Oren et al. | |
| 2007/0278285 A1* | 12/2007 | Ehrensvaerd | G06Q 10/08 235/375 |
| 2007/0288765 A1* | 12/2007 | Kean | G06F 21/76 713/193 |
| 2009/0060197 A1 | 3/2009 | Taylor et al. | |
| 2009/0280774 A1 | 11/2009 | Patel et al. | |
| 2012/0047371 A1 | 2/2012 | Woodall | |
| 2013/0332745 A1 | 12/2013 | Woodall | |

FOREIGN PATENT DOCUMENTS

| | | | |
|---|---|---|---|
| JP | 2003507785 A | 2/2003 | |
| JP | 2005099168 A | 4/2005 | |
| JP | 2007329688 A | 12/2007 | |

OTHER PUBLICATIONS

"Block Cipher Modes of Operation," Sep. 2006. (Year: 2006).*

Notice of Allowance dated Oct. 31, 2017 for U.S. Appl. No. 13/967,400; 8 Pages.
Final Office Action dated Mar. 2, 2017 for U.S. Appl. No. 13/967,400; 9 Pages.
Response to Non-Final Office Action dated Oct. 25, 2016 for U.S. Appl. No. 13/967,400; Response filed Jan. 10, 2017; 10 Pages.
Non-Final Office Action dated Oct. 25, 2016 for U.S. Appl. No. 13/967,400; 10 Pages.
"Japanese Application Serial No. 2011-127714, Office Action dated Jun. 23, 2015", w/English Translation; 9 Pages.
"Japanese Application Serial No. 2011-127714, Response filed Aug. 4, 2015 to Office Action dated Jun. 23, 2015", w/Partial English Translation; 8 Pages.
"U.S. Appl. No. 12/861,586, Non-Final Office Action dated Jul. 9, 2012", 11 Pages.
"U.S. Appl. No. 12/861,586, Response filed Oct. 9, 2012 to Non-Final Office Action dated Jul. 9, 2012", 12 Pages.
"U.S. Appl. No. 12/861,586, Non-Final Office Action dated Dec. 20, 2012", 11 Pages.
"U.S. Appl. No. 12/861,586, Response filed Mar. 20, 2013 to Non-Final Office Action dated Dec. 20, 2012", 16 Pages.
"U.S. Appl. No. 12/861,586, Notice of Allowance dated Apr. 18, 2013", 13 Pages.
"European Application Serial No. 11169941.9, Extended Search Report dated Jan. 2, 2012", 7 Pages.
"European Application Serial No. 11169941.9, Response filed Aug. 27, 2012 to Extended Search Report dated Jan. 2, 2012", 19 Pages.
Whiting et al., "Request for Comments: 3610-Counter with CBC-MAC (CCM)", Sep. 2003, 2 Pages.
Supplemental Appeal Brief filed Jul. 27, 2017 for U.S. Appl. No. 13/967,400; 18 Pages.

* cited by examiner

SECURE FIELD-PROGRAMMABLE GATE ARRAY (FPGA) ARCHITECTURE

CROSS REFERENCE TO RELATED APPLICATIONS

This application is a continuation of application of U.S. patent application Ser. No. 13/967,400, filed Aug. 15, 2013, entitled "SECURE FIELD-PROGRAMMABLE GATE ARRAY (FPGA) ARCHITECTURE," which is a continuation of application of U.S. patent application Ser. No. 12/861,586, filed Aug. 23, 2010, entitled "SECURE FIELD-PROGRAMMABLE GATE ARRAY (FPGA) ARCHITECTURE." The applications cited in this paragraph are incorporated herein by reference in their entirety.

FIELD OF THE INVENTION

This application is directed to field-programmable gate array (FPGA) devices and, in particular, to secure FPGA devices in which the confidentiality and authenticity of the FPGA load is desired.

BACKGROUND

Conventionally, techniques for configuring or programming an FPGA include encrypting configuration data, and storing the encrypted data in a memory unit within the FPGA or in an external storage device operatively connected with the FPGA. However, typically, the key to encrypt arid decrypt (at the time of FPGA configuration) configuration data is stored internally in a memory unit in the FPGA. Alternatively, the key may be stored externally, and may be passed to the FPGA for configuration through a standard interface, such as the Joint Test Action Group (JTAG) interface. However, both these key management implementations do not provide a sufficiently robust method for confidentiality or authentication of the FPGA key or FPGA-configuration data.

Such key management implementations may be susceptible to an attack by a malicious entity, which may result in an unauthorized access to the FPGA key. The FPGA key may be captured from the unsecured storage unit in the FPGA, or may be captured during an unsecure transfer in the JTAG interface. The captured key may then be used by an adversary to decrypt the FPGA-configuration data and make unauthorized copies. Alternatively, or in addition, the configuration data may be reverse-engineered to understand the functionality of the FPGA, and may be further modified to make the FPGA perform unintended functions.

SUMMARY

In one or more embodiments, this disclosure provides embodiments of a secure FPGA device, architecture, and method in which the confidentiality of the decryption key for the FPGA load is established and maintained by not storing the key locally at the FPGA. In another aspect of various embodiments, a flexible method is disclosed that securely transfers the FPGA load-decryption key from its external storage location or device, e.g., a secure processor into the FPGA in real-time. Further, a mechanism is disclosed that not only establishes initial authenticity, but maintains recurring authenticity while the FPGA is in operation without degrading FPGA performance.

In one or more embodiments of this disclosure, the FPGA architecture includes a non bypassable loader. and a key management protocol. The non-bypassable loader may allow for an initial authentication and decryption of PGA-configuration data as well as recurring authentication of the FPGA-configuration data. The key management protocol may allow an FPGA load-decryption key to be transmitted to the FPGA securely from a storage or a device located external to the FPGA.

In one embodiment, a system for configuring an FPGA includes a key interface, a Load interface, a key-security unit and a configuration-data security unit. In some embodiments, one or more of the key interface, the load interface, the key-security unit, the configuration-data security unit and the state-encryption unit are internal to or part of the FPGA. The key interface may receive an encrypted FPGA load-decryption key at an FPGA from a remote key-storage device. The remote key-storage device may be external to and operatively connected with the FPGA. The key-security decryption unit may decrypt the encrypted FPGA load-decryption key using an ephemeral session key to provide a decrypted FPGA load-decryption key. In one embodiment, a session key is calculated either at the FPGA and the remote key-storage device, using a key-agreement protocol, e.g, a Menezes-Qu-Vanstone (MQV) protocol, an Elliptic curve MQV (EC-MQV) protocol, or a Diffie-Hellman protocol. In some embodiments, the session key is a function of the ephemeral session key. and a common key stored in both the FPGA and the remote key-storage device. In some embodiments, the remote key-storage device includes a secure processor, which may be configured to use the key-agreement protocol in conjunction with the FPGA, and to facilitate the generation of the session key as an output of the remote key-storage device.

After, or in parallel with, the decryption of the FPGA load-decryption key, encrypted FPGA configuration data for configuring the FPGA may be received at the FPGA at the load interface. The FPGA-configuration data may be received at the load interface from a memory device, e.g., a non-volatile memory device including one or more of a programmable read-only memory (PROM) device, an erasable PROM (EPROM) device, and an electrically erasable PROM (EEPROM) device. In some embodiments, the FPGA-configuration data is encrypted. The encryption of the FPGA-configuration data may be executed using an advanced encryption standard counter with cipher-block chaining message authentication code (AES-CCM) encryption mode.

In some embodiments, the configuration-data security unit decrypts and performs an initial authentication of the FPGA-configuration data using the FPGA load-decryption key. The decryption and initial authentication of the FPGA-configuration data, e.g., using configuration data security unit may be non-bypassable to configure the FPGA. In one embodiment, the second decryption unit may generate a cryptographic state associated with the FPGA configuration data, which may be used for initial and/or recurring authentication of FPGA-configuration data. In one embodiment, the cryptographic state is a function of or determined by at least a part of the FPGA configuration data. In some embodiments, for recurring authentication of the FPGA load, the system further includes an authentication input interface, a state-encryption unit, and an authentication output interface. The authentication input interface may be used for receiving a challenge message at the FPGA from an authentication device. The authentication device may be external to and operatively connected with the FPGA. In some embodiments, the authentication device generates the challenge message, e.g., a random number. The authentication device.

May further encrypt and sign the challenge message before sending it out to the authentication input interface. In some embodiments, if the challenge message is encrypted and signed by the authentication device, the state-encryption unit authenticates and decrypts the challenge message before further processing. The state-encryption unit may then encrypt the challenge message using the cryptographic state and the session key to generate a response message. In addition to the FPGA and the remote key-storage device, the session key may also be stored in the authentication device. The state-encryption unit may encrypt the challenge message to generate the response message using an advanced encryption standard cipher-block chaining (AES-CBC) encryption mode. In the AES-CBC encryption mode, the cryptographic state may be used as an initialization vector (IV) for the first cycle of the recurring authentication. For subsequent authentication attempts, the response message from the previous authentication cycle may be used in the initialization vector for AES-CBC encryption. The response message may be sent to the authentication device through the authentication output interface. In some embodiments, at the authentication device, the response message is decrypted to generate a decrypted challenge message. If the decrypted challenge message is same as the (original) challenge message, the FPGA-configuration data is indicated as authentic.

In another embodiment, a method of configuring a field-programmable gate array (FPGA) includes receiving, at the FPGA, an encrypted FPGA load-decryption key from a remote key-storage device, which may be external to and operatively connected with the FPGA. The encrypted FPGA load-decryption key may be decrypted, in a key-security unit, using an ephemeral session key to generate a decrypted FPGA load-decryption key. In one embodiment, the session key is calculated either at the FPGA, the remote key-storage device, or both, using a key-agreement protocol, e.g., a Menezes-Qu-Vanstone (MQV) protocol, an Elliptic-curve MQV (EC-MQV) protocol, or a Diffie-Hellman protocol. Encrypted FPGA-configuration data may be received at the FPGA, and decrypted and authenticated, in a configuration-data security unit, using the decrypted FPGA load-decryption key. In some embodiments, the FPGA-configuration data is encrypted, and the encryption may be executed using an advanced encryption standard counter with cipher-block chaining message authentication code (AES-CCM) encryption mode. In some embodiments, the step of decryption and initial authentication at the configuration-data security unit is non-bypassable for successful configuration of the FPGA.

The decryption of the FPGA-configuration data may indicate a cryptographic state associated with the FPGA configuration data. The cryptographic state may be a function of or determined by at least a part of the FPGA configuration data. In one embodiment, the method may further perform recurring authentication of the FPGA-configuration data. Such recurring authentication may include receiving a (encrypted or unencrypted) challenge message at the FPGA from an authentication device, which may be external to and operatively connected with the FPGA. The received challenge message may be encrypted in a state-security unit using the cryptographic state and the session key to generate a response message. In addition to the FPGA and the remote key-storage device, the session key may also be stored in the authentication device. The challenge message may be encrypted to generate the response message using an advanced encryption standard cipher-block chaining (AES-CBC) encryption mode. In the AESCBC encryption mode, the cryptographic state may be used as an initialization vector (IV) for the first cycle of the recurring authentication for subsequent authentication attempts, the response message from the previous authentication cycle may be used in the initialization vector for AES-CBC encryption. The response message may then be sent to the authentication device, where the response message may be decrypted to generate a decrypted challenge message. If the decrypted challenge message is same as the (original) challenge message, the FPGA configuration data is indicated as authentic.

In another embodiment, a system for configuring a field-programmable gate array (FPGA) includes a load interface that receives encrypted FPGA-configuration data at the FPGA. The FPGA-configuration data may be decrypted and authenticated in a configuration-data security unit using a FPGA load-decryption key. The configuration-data security unit may generate a cryptographic state associated with the FPGA-configuration data. The system may further include an authentication input interface, a state-encryption unit, an authentication output interface, and a programmable logic.: circuit. The authentication input interface may receive a challenge message at the FPGA from an authentication device which may be external to and operatively connected with the FPGA). The state-encryption unit may encrypt the challenge message using the cryptographic state to generate a response message, and the authentication output interface may then send the response message to the authentication device. The authentication device may decrypt the response message to generate a decrypted challenge message. If the decrypted challenge message is same as the (original) challenge message, the FPGA-configuration data is indicated as authentic. If FPGA-configuration data is authenticated by the authentication device, the programmable logic circuit may be programmed using the FPGA-configuration data.

In another embodiment, an article of manufacture comprising a tangible computer readable medium that contains computer instructions therein, which when executed by a processor carries out the functions of receiving, at an FPGA, an encrypted FPGA loaded encryption key from a remote key-storage device, which may be external to and operatively connected with the FPGA. The encrypted FPGA load-decryption key may be decrypted in a key-security unit to generate a decrypted FPGA load-decryption key. Encrypted FPGA configuration data may be received at the FPGA and decrypted (and authenticated) in a configuration-data security unit using the decrypted FPGA load-decryption key. The decryption of the FPGA configuration data may indicate a cryptographic state associated with the FPGA configuration data. The cryptographic state may be a function of or determined by at least a part of the FPGA configuration data. In one embodiment, the method may further include receiving a challenge message at the FPGA from an authentication device, which may be external to and operatively connected with the FPGA. The challenge message may be encrypted in a state-security unit using the cryptographic state to generate a response message. The response message may then be sent to the authentication device, where the response message may be decrypted to generate a decrypted challenge message. If the decrypted challenge message is same as the (original) challenge message, the FPGA-configuration data is indicated as authentic.

BRIEF DISCUSSION OF THE DRAWINGS

Figure 2:
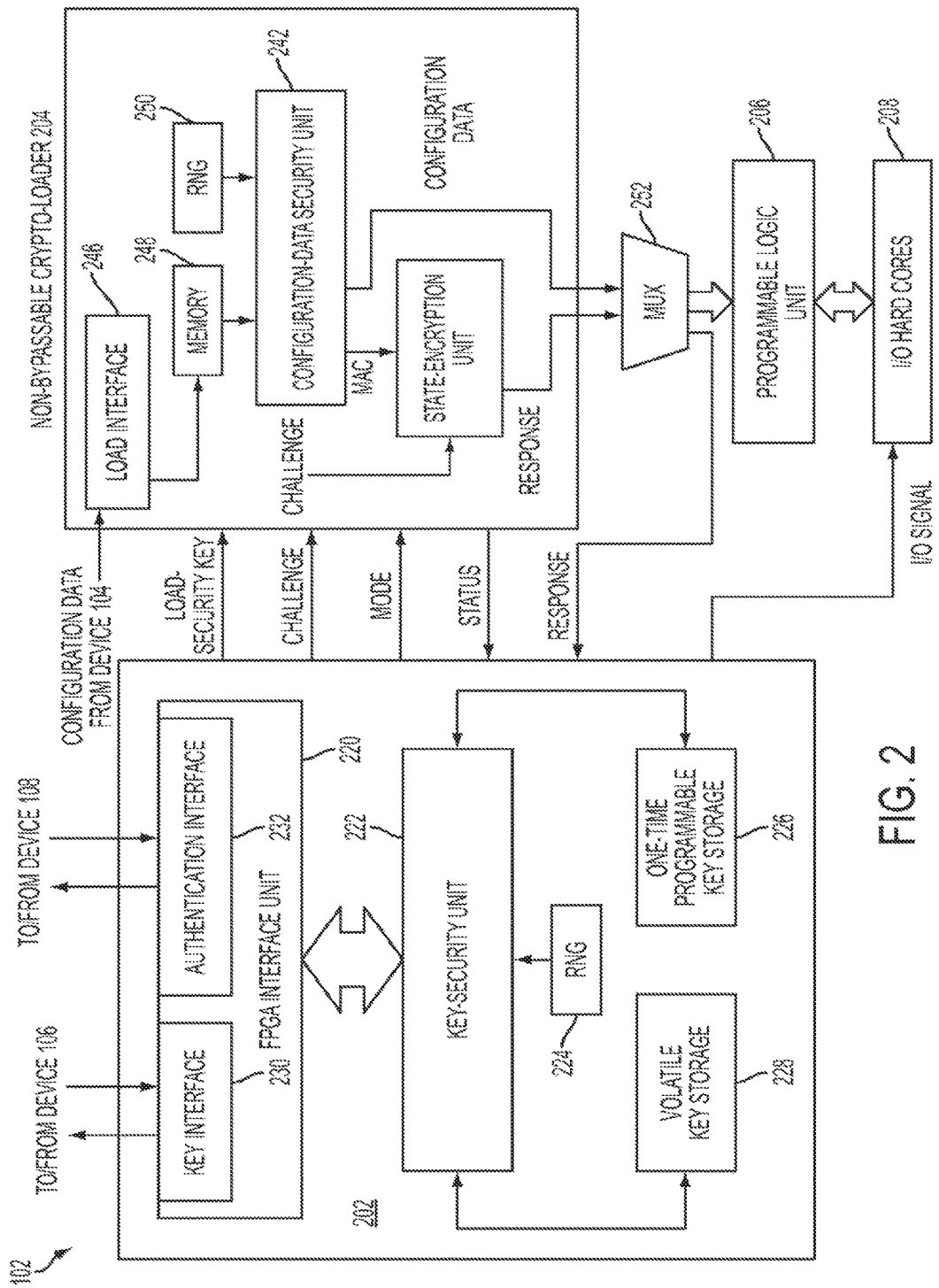

FIG. 1 provides a block diagram of an exemplary system to configure an FPGA according to an embodiment of this disclosure; and FIG. 2 provides a block diagram of an exemplary embodiment of an FPGA of this disclosure.

DETAILED DESCRIPTION

Various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described wherein in terms of specific exemplary embodiments that may perform certain actions. However, it will be apparent that such descriptions are merely for convenience and that such actions, in fact, result from computing devices, processors, controllers, or other devices executing the firmware, software, routines, or instructions.

FIG. 1 depicts a functional block diagram of system 100 for securely configuring FPGA 102. To configure FPGA 102, system 100 may include FPGA-configuration data storage device 104, remote key-storage device 106 and authentication device 108. FPGA-configuration data storage device 104 may store and provide encrypted or unencrypted configuration or "load" data to FPGA 102. At least a part of the configuration data may be used to configure FPGA 102. Remote key-storage device 106 may store and securely provide a key to FPGA 102 for decrypting the configuration data at FPGA 102, if the configuration data was provided to FPGA 102 in the encrypted form. In one embodiment, remote key-storage device 106 may include processor 120, non-volatile memory unit 122, volatile memory unit 124, and random number generator (RNG) 126. Storing a configuration data key non-locally, i.e. off-FPGA, at remote key-storage device 106, may enhance the FPGA configuration security from entities which may try to hack into FPGA 102. Those hacking entities may modify and/or copy and reverse-engineer the FPGA configuration data in an unauthorized way.

To authenticate that configuration data at FPGA 102 has not been modified or otherwise tampered with, FPGA 102 may be engaged with authentication device 108 in a recurring authentication process. The recurring authentication process may ensure the security of the configuration data at the start and during the operation of FPGA 102. In one embodiment, as depicted in FIG. 1, authentication device 108 may include random number generator (RNG) 170, authentication-crypto (AC) engine 172 and memory device 174. In one embodiment, remote key storage device 106 and/or authentication device 108 are (or are parts of) a secure processor external to and operatively connected with FPGA 102. In some embodiments, a secure processor is a processor in which processing of data (or programming code, or both) is protected such that all operations performed on the data are authentic and confidential. All inputs to the secure processor are authenticated before further processing. A secure processor may allow some data to reside in an external memory when confidentiality is not required, but such external data is still protected from any modification using authentication process within the secure processor. In one or more embodiments, each of FPGA 102, devices 104, 106, 108, or their respective subcomponents (described below) may include one or more processors and/or memory modules, to perform the functions and processes described herein. Structural and functional details of all components of system 100 will be described in detail below.

Although devices 104, 106 and 108 are shown as individual components in system 100, in one or more embodiments, devices 104, 106 and 108 may be combined into just one or two devices. In one embodiment, FPGA 102 and devices 104, 106 and 108 may be designed to be placed and operational on a same circuit in a chip. In another embodiment, FPGA 102 may be operational on a chip in one system (e.g., a chip in an unmanned vehicle), and one or more of devices 104, 106 and 108 may be part of another system which is located geographically remotely from the FPGA system (e.g., a remote operations system for the unmanned vehicle). If FPGA 102 is located remotely from the other devices of system 100, one or more of devices 104, 106 and 108 may be operatively connected with FPGA 102 through a wired or wireless network (not shown) using necessary interfaces and components. Such network may include one or more of a private TCP/rP network, the Internet, or a private or public radio frequency (RF) network. In the case where remote key-storage device 106 and authentication device 108 are implemented as two separate devices (e.g., as two separate circuits or chips), it will be understood by a person of ordinary skill in the art that one or more system parameters (e.g., a session key) will be shared by both the devices 106, 108.

FIG. 2 shows exemplary FPGA 102 according to one or more embodiments of this disclosure. As shown, FPGA 102 includes controller 202, non-bypassable crypto-loader 204, programmable logic 206 and input/output (1/0) cores 208. For clarity, resources and/or components of FPGA 102 not required or related to configuration of FPGA 102 are not shown in FIG. 2 or subsequent figures of this disclosure, but those resources/components will be appreciated by a person of ordinary skill in the art. In one embodiment, controller 202 interfaces with devices 104, 106 and 108 of system 100 to receive and. send messages and/or data (e.g., configuration data, key, authentication messages, etc.). Additionally, among other purposes, controller 202 may be connected with and control non-bypassable crypto-loader 204, logic unit 206 and 1/0 cores 208 by exchanging data and/or messages to and from those FPGA components. In one or more embodiments, controller 202 includes FPGA interface unit 220, key security unit 222, random number generator (RNG) 224, one-time programmable key storage (OPKS) unit 226, and volatile key storage (VKS) unit 228.

In one embodiment, FPGA interface unit 220 includes interfaces (i.e., key interrace 230 and authentication interrace 232) to facilitate exchange of messages and/or data between components which may be internal and external to FPGA 102. For example, using key interrace 230, FPGA interface unit 220 may receive a cryptographic key (or a "FPGA load decryption" key) from remote key-storage device 106. The cryptographic key may be used to decrypt encrypted FPGA-configuration data to configure FPGA 102. As discussed above, the cryptographic key may be stored at remote key-storage device 106 (i.e., external to FPGA 102) to maintain confidentiality of the cryptographic key and for secure transfer to FPGA 102, when needed. In one embodiment, the cryptographic key may be received at FPGA 102 via key interface 230 in an encrypted form. For example, the cryptographic key may be encrypted using a session key. In one embodiment, the session key may be calculated and stored at the remote key-storage device, and then securely transferred to FPGA 102 along with the cryptographic key.

In another embodiment, the session key is calculated and stored at both remote key-storage device 102 and FPGA 102. For example, the session key may be calculated using one or more of various key-agreement protocols, such as Menezes-Qu-Vanstone (MQV) protocol, an Elliptic curve MQV (EC-MQV) protocol, or a Diffie-Hellman protocol. The key-agreement protocol used to calculate the session key may engage and be executed by one or more processors or processing modules associated with remote key-storage device 106 (e.g., processor 120) and FPGA controller 202 (e.g., key-security unit 222). Additionally, one or more memory devices in remote key-storage device 106 (e.g., memory unit 122) and in FPGA controller 202 (e.g., OPKS unit 226 and VKS unit 228) may be used to store parameters and/or other data generated by the key-agreement protocol. Random number generator 224 in FPGA controller 202 and/or random number generator 126 in remote key-storage device 106 may also be used as part of the execution of the key-agreement protocol.

In one embodiment, the EC-MQV protocol is used as the key-agreement protocol to calculate the session key. The EC-MQV protocol may protect the configuration key (and hence the configuration data of FPGA 102) from both passive attacks (where an adversary/hacking entity attempts to prevent the protocol from achieving its goals by merely observing entities executing out the protocol, i.e., remote key-storage device 106 and key-security unit 222), and active attacks (where an adversary additionally subverts the communications between the protocol-executing entities by injecting, deleting, altering or replaying messages). Additionally, the EC-MQY protocol may provide the following advantages for secure cryptographic key communication:

1. Known-key security: Each run of EC-MQV protocol between remote key-storage device 106 and key-security unit 222 may produce a unique secret key. Such keys are called common session keys, and are used to encrypt the cryptographic key at the remote key-storage device 106, and to decrypt the encrypted cryptographic. key at key-security unit 222. EC-MQV protocol may achieve its goal of secure transfer of cryptographic key from remote key-storage device 106 to FPGA controller 202 even in the face of an adversary who has learned some other common session keys.

2. Perfect forward secrecy: If long-term private keys of one or more protocol-executing entities are compromised, the secrecy of previous common session keys established by those protocol-executing entities is not affected.

3. Key-compromise impersonation: In case a long-term private key associated with key security unit 222 is disclosed or stolen by an adversary, the adversary may impersonate key security unit 222. However, using the EC-MQV protocol may not enable an adversary to impersonate other entities to key-security unit 222.

4. Unknown key-share: EC-MQV protocol may prevent a protocol-executing entity (key security unit 222 or remote key-storage device 106) from being coerced into sharing a key with the other protocol-executing entity without the protocol-executing entity's knowledge.

5. Key control: Neither protocol-executing entity should be able to force the common session key to a preselected value.

6. Low overhead: EC-MQV protocol may a minimal number of passes (the number of messages exchanged in a run of the protocol) between the protocol-executing entities, and low communication overhead (total number of bits transmitted).

In operation, as part of EC-MQV protocol, each remote key-storage device 106 and key-security unit 222 generate a static or long-term key pair and an ephemeral or short-term key pair. While, the static key pair is bound to the respective entity for a certain period of time, the ephemeral key pair is generated for each run of the protocol. Both the static and ephemeral key pairs for remote key-storage device 106 and key-security unit 222 may be generated using certain parameters (common to both units 106 and 222, and) specific to EC-MQY protocol which will be well-known to a person skilled in the art. For example. such parameters may include elliptic curve EC of characteristic p defined over a finite field r~ (where q is the field size), a base (finite) point P on the curve EC, order 11 of the point J>, and cofactor h. These parameters may be stored in respective non-volatile memory devices in FPGA controller 202 (e.g., OPKS unit 226) and in memory unit 122 in remote key-storage device 106. The nonvolatile memory devices be one or more of programmable read-only memory (PROM) device, an erasable PROM (EPROM) device, and an electrically-erasable PROM (EEPROM) device. The EC-MQV protocol parameters stored in these memory devices may be directly or indirectly accessible to key-security unit 222 and to processor 120 in device 106.

Static private key ($s_{222}$) of key-security unit 222 may be generated using RNG 224 to provide a random number from the interval [1, n–1]. Thereafter, key-security unit's static pubic key ($S_{222}$) may be calculated as a point on elliptic curve E, such that $S_{222}=s_{222}P$. The static key pair ($S_{222}$, $s_{222}$) may be stored in OPKS unit 226. The static key pair ($S_{106}$, $s_{106}$) for remote key-storage device 106 may also be generated in a similar manner using RNG 126, and then stored in non-volatile memory 122 in device 106. In one embodiment, the static public keys $S_{222}$ and $S_{106}$ are exchanged by FPGA controller 202 and remote key-storage device 106 (via, e.g., interface unit 220), where those public keys are stored in the respective non-volatile memory devices.

Further, ephemeral key pairs at key-security unit 222 and remote key-storage device 106 may be generated as follows. Key-security unit 222 may first generate an ephemeral private key ($e_{222}$) as a random number in the interval [1,n–1] using RNG 224, calculate an ephemeral public key ($E_{222}$) as $E_{222}=e_{222}P$, and then send the public key $E_{222}$ to remote key-storage device 106. The ephemeral key pair ($E_{222}$, $e_{222}$) may be stored in OPKS unit 226. Similarly, ephemeral key pair (Elm, elm) may also be generated and stored at remote key-storage device 106, and the ephemeral public key $E_{106}$ may be sent to FPGA controller 202 and stored in OPKS unit 226.

Key-security unit 222 may validate the public keys S106 and E106 received from remote key-storage device 106 using one or more known validation processes defined for the EC-MQV protocol. Upon successful validation, unit 222 computes:

$$I_{222}=(e_{222}+E'_{222}s_{222}) \bmod n, \text{ and}$$

Session key at unit 222, $K=h\ I_{222}(E_{106}+E'_{106}S_{106})$, where E' for key E is computed as $(x' \bmod 2^{f/2})+2^{f/2}$, where x' is an integer obtained from a binary representation of x-coordinate of E (on elliptic curve EC), and $f=\log_2 n+1$. If session key K=0, key-security unit 222 may terminate the protocol, and send a "fail" status to remote key-storage device 106 as an indication to restart the protocol execution.

At the same time as key-security unit 222, based on the parameters and key pairs, remote key-storage device 106 computes:

$I_{106}=(e_{106}+E'_{106}s_{106}) \bmod n$, and

Session key at device 106, $K=h\ I_{106}(E_{222}+E'_{222}S_{222})$.

The session key, K computed at both units 106 and 222 are identical and, because it is calculated for each run of the EC-MQV protocol, the session key, K, is stored in volatile memory devices at key-security unit 222 (e.g., at VKS unit 228) and at remote key-storage device 106 (e.g., in memory unit 124).

After having calculated the session key, K, the cryptographic key or FPGA load-decryption key stored at the remote key-storage device 106 may be encrypted using the session key, K. The encrypted FPGA load-decryption key may then be sent by device 106 to FPGA 102, where the FPGA load-decryption key may be received at key interface 230. Key interface 230 passes the encrypted key to key-security unit 222, and unit 222 then decrypts the encrypted FPGA load-decryption key using the (previously computed and stored) session key, K. The decrypted FPGA load-decryption key thus obtained may be transferred from unit 222 to crypto-loader 204 via, e.g., interface unit 220 (as depicted in FIG. 2).

In one embodiment, crypto-loader 204 includes configuration-data security (CDS) unit 242, state-encryption (SE) unit 244, load interface 246, memory 248, and random number generator (RNG) 250. In some embodiments, both RNG 224 and RNG 250 may be implemented as a single device in system 100. Crypto-loader 204 may be configured to decrypt FPGA-configuration data received from an external storage device, e.g., storage device 104, and configure logic unit 206 using the configuration data. Additionally, crypto-loader 204 may be configured to operate in conjunction with FPGA controller 202 and authentication device 108 to perform initial and/or recurring authentication of the configuration data. In one embodiment, FPGA 102 may be implemented in a manner such that all configuration data decryption and authentication processes are performed in crypto-loader 204. In other words, for configuring FPGA 102, it may not be possible to bypass crypto-loader 204. Such implementation may ensure that for each run of FPGA configuration, configuration data is checked for confidentiality and authenticity.

In operation, encrypted FPGA-configuration data may be received at load interface 246 from storage device 104. Load interface 246 may forward the data internally to memory 248 to be stored therein. In one embodiment, the FPGA load-decryption key received from interface unit 220 may also be stored in memory 248. Storage device 104 may be (or may include) one or more of a programmable read-only memory (PROM) device, an erasable PROM (EPROM) device, and an electrically-erasable PROM (EEPROM) device. In one embodiment, CDS unit 242 may be operatively connected with memory 248 to fetch the encrypted FPGA-configuration data and the FPGA load-decryption key. Further, CDS unit 242 may be configured to decrypt the configuration data using a block-cipher algorithm that may provide both confidentiality and initial authentication of the configuration data. One assumption is that CDS unit 242 uses the same block-cipher algorithm that was used to encrypt the FPGA-configuration data (stored at storage device 104) with the same FPGA load-decryption key initially stored at remote key-storage device 106. In one embodiment, CDS unit 242 decrypts the FPGA-configuration data using an advanced encryption standard (AES) algorithm. The AES algorithm is known to include various modes of operation, e.g., electronic codebook (ECB) mode, cipher-block chaining (CBC) mode, propagating CBC mode, counter (CTR) mode, counter with cipher-block chaining-message authentication code (CCM) mode, etc. In one embodiment, CDS unit 242 employs AES-CCM mode that combines CTR mode for encryption (and therefore, confidentiality), and cipher-block chaining-message authentication code (CBC-MAC) mode for initial authentication of the configuration data. In one embodiment, the mode of operation of CDS unit 242 is selected by controller 202, and indicated to loader 204 using a "mode" signal (as shown in FIG. 2). In some embodiments, instead of a single AES mode (e.g., AES-CCM mode), CDS unit 242 may be configured to utilize two separate algorithms—one for encryption-decryption of the configuration data and the other for initial authentication of the configuration data.

Based on the assumption that CCM mode was also used to (pre-)encrypt the configuration data, the FPGA-configuration data (received from storage device 104) may include the (original) data used to configure FPGA 102, and data that indicates a cryptographic state of the FPGA-configuration data. In one embodiment, the cryptographic-state data includes message authentication code (MAC) value generated during (pre-)encryption of configuration data. For example, the MAC value may be generated as an output of the CBC-MAC mode of the CCM algorithm executed on the original FPGA-configuration data. Accordingly, the calculated MAC value may be based on (or a function of) at least a part of the original FPGA-configuration data. The calculated MAC value may then be combined or associated with the original FPGA-configuration data for encryption using the CTR mode of the CCM algorithm to provide the encrypted FPGA-configuration data.

For decrypting and authenticating using the CCM mode, CDS unit 242 first run the CTR mode to decrypt the encrypted FPGA-configuration data using a nonce as the initial value (IV) for the CTR mode, and the FPGA load-decryption key (fetched from memory 248). In one embodiment, the nonce is generated using RNG 250 in loader 204. The execution of the CTR mode may recover the original FPGA-configuration data and the associated MAC value. In one embodiment, CDS unit 242 may copy the recovered FPGA-configuration data and/or the recovered MAC value in memory 248. CDS unit 242 may then run the CBC-MAC mode of the CCM algorithm on the recovered FPGA-configuration data using an initial value generated using RNG 250 (different than the value used in the CTR mode), and the FPGA load-decryption key. The CBC-mode may use zero as the initial value, instead of the value from RNG 250. The execution of the CBC-MAC mode may result in a "new" MAC value which is compared by CDS unit 242 with the recovered MAC value to authenticate the FPGA-configuration data. For example, if the FPGA-configuration data were modified or tampered with in any form after (pre-)encryption, the MAC value generated by the CBC-MAC mode at CDS unit 242 would not be the same as the original MAC value recovered by the CTR mode. Accordingly, if it is determined that the new MAC value is not same as the recovered MAC value, loader 204 may discard the FPGA-configuration data and send a "status" signal to controller 202 indicating unauthorized access and/or modification of configuration data in system 100, thereby terminating the FPGA-configuration process. Alternatively, if the new MAC value is determined to be the same as the recovered MAC value, a status signal indicating the successful decryption and authentication of the FPGA-configuration data is sent to controller 202, and the recovered FPGA-configuration data is passed to logic unit 206 via multiplexer 252. Logic unit 206 may be programmed using the recovered FPGA-configuration data. Thereafter, logic unit 206 may be operatively connected with 110 cores 208 to send and receive data required for operation of FPGA 102. Controller 202 may control the timing of data access and communication between logic unit 206 and I/O cores 208 using an "I/O" signal.

After decrypting and recovering the FPGA-configuration data, there is a possibility that an adversary may passively monitor the operation of the FPGA and may try to access and/or change the FPGA-configuration data. Such unauthorized data access/modification may result in a completely unintended functionality of the FPGA, and therefore, it is important to authenticate the FPGA-configuration data on a recurring basis. A time period to run such authentication on FPGA 102 may be pre-provisioned in system 100, or may be set by a user at will. Accordingly, for such recurring authentication process, FPGA 102 operates in conjunction with authentication device 108. For example, the FPGA 102 may be operatively connected with authentication device 108 to execute AES-CBC encryption mode for authentication purposes.

To start the authentication process under CBC mode, authentication device 108 may generate a challenge message which is sent out to FPGA 102 and received at an authentication interface 232 of interface unit 220. The challenge message may be a message including a random number generated by RNG 170, and stored in memory 174 of authentication device 108. At controller 202, interface 232 may pass the received challenge message to crypto-loader 204. Additionally, the session key (previously generated by key-security unit 222) stored in VKS unit 228 may be transferred to crypto-loader 204 to be. stored in memory 248. Further, in operation, controller may send a mode signal to crypto-loader 204 to indicate CBC-encryption mode, and to invoke state-encryption (SE) unit 244 to execute the CBC mode. SE unit 244 may execute the CBC-encryption mode by taking the challenge message as the input message, the session key as the CBC-mode key, and the new MAC value generated by CDS unit 242 (during CCM-mode decryption) as the initial value for the CBC mode. SE unit 244 may then produce a response message as an output which is transferred to interface unit 220 to be eventually transferred to authentication device 108. In one embodiment, interface 232 act as an authentication input interface as well as an authentication output interface, and accordingly, may be used to send out the response message to authentication device 108.

At authentication device 108, the response message may be stored in memory 174 of device 108, and AC engine 172 may be configured to execute decryption of the response message using CBC mode. To run CBC-mode decryption, AC engine 172 may be provided with the session key from either FPGA 102 or remote key-storage device 106. Additionally, as an initial value for CBC modem, the recovered MAC value from the CDS unit 242 may be copied to AC engine 172 via interface 232. Based on these received data, AC engine 172 may decrypt the response message to generate a decrypted challenge message. AC engine 172 may then compare the decrypted challenge message with the challenge message originally sent to FPGA 102 to determine the authenticity of FPGA-configuration data. For example, in the case of unauthorized access and/or modification of the FPGA-configuration data, the new MAC value used as the initial value for the challenge-message encryption at SE unit 244 will be different than the recovered MAC value used for the response-message decryption by AC engine 172. Accordingly, the decrypted challenge message will not be the same the challenge message originally sent out to FPGA 102, thereby indicating that the FPGA-configuration data may be not be authentic, and may have been modified or accessed in an unauthorized manner. Such indication from authentication 108 may be used to terminate the FPGA-configuration process, and restart the process after the unauthorized entity is identified and blocked, and/or configuration data is reloaded or corrected. For each cycle of recurring authentication, a new challenge message may be generated by authentication device 108, and the response message generated in the previous CBC-mode encryption may be used as an initial value for the next CBC-mode encryption. The same session key used in the first authentication cycle may be used as the CBC-mode key in all subsequent authentication cycles.

Some details related to the known cryptographic algorithms discussed above, i.e., EC-MQV algorithm, CCM algorithm and CBC algorithm, are not provided in this application. Moreover, the above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

What is claimed is:

1. A method of using a stateful encryption algorithm for non-bypassable FPGA configuration, the method comprising:
    before encrypting FPGA-configuration data, generating, by a cryptographic algorithm, a first message authentication code (MAC) value using the FPGA-configuration data and a first initial value, wherein the first MAC value indicates a cryptographic state of the FPGA-configuration data;
    encrypting the FPGA-configuration data;
    receiving, at an FPGA, the encrypted FPGA-configuration data and the first MAC value;
    decrypting, at the FPGA, the encrypted FPGA-configuration data;
    generating, by the cryptographic algorithm, a second MAC value using the decrypted FPGA-configuration data and the first initial value;
    comparing the first MAC value with the second MAC value;
    in response to the first MAC value being the same as the second MAC value, authenticating the decrypted FPGA-configuration data;
    receiving, at the FPGA, a challenge message from an authentication device;
    generating, by the cryptographic algorithm, a third MAC value using the challenge message and the second MAC value as a second initial value;
    encrypting, at the FPGA, the challenge message to generate a response message, wherein the response message includes the third MAC value; and
    transmitting the response message from the FPGA to the authentication device.

2. The method of claim 1 further comprising:
    receiving the response message at the authentication device; and
    comparing, at the authentication device, the response message to an expected response message.

3. The method of claim 2 further comprising:
    decrypting the received response message;
    generating a fourth MAC value based upon the decrypted response message and the second initial value; and comparing the fourth MAC value generated the third MAC value recovered from the response message to determine authenticity of the FPGA-configuration data.

4. A field-programmable gate array (FPGA) comprising:
one or more interfaces-configured to:
  receive encrypted FPGA-configuration data and a first message authentication code (MAC) value that is generated by a cryptographic algorithm using unencrypted FPGA-configuration data and a first initial value, wherein the first MAC value indicates a cryptographic state of the unencrypted FPGA-configuration data; and
  receive a challenge message from an authentication device;
a state-encryption unit configured to:
  decrypt the encrypted FPGA-configuration data;
  generate, by the cryptographic algorithm, a second MAC value using the decrypted FPGA-configuration data and the first initial value;
  compare the second MAC value with the first MAC;
  in response to the first MAC value being the same as the second MAC value, authenticate the decrypted FPGA-configuration data;
  generate, by the cryptographic algorithm, a third MAC value using the challenge message and the second MAC value as a second initial value;
  encrypt the challenge message to generate a response message, wherein the response message includes the third MAC value; and the one or more interfaces are configured to transmit the response message to the authentication device; and
a programmable logic unit configured to:
  receive the decrypted FPGA-configuration data.

5. A system comprising:
a field-programmable gate array (FPGA) configured to:
  receive encrypted FPGA-configuration data and a first message authentication code (MAC) value that is generated by a cryptographic algorithm using unencrypted FPGA-configuration data and a first initial value, wherein the first MAC value indicates a cryptographic state of the unencrypted FPGA-configuration data;
  decrypt the encrypted FPGA-configuration data;
  compare the first MAC value with a second MAC value that is generated by the cryptographic algorithm using the decrypted FPGA-configuration data and the first initial value; and
  in response to the first MAC value being the same as the second MAC value, authenticate the decrypted FPGA-configuration data and configure a programmable logic unit of the FPGA with the decrypted FPGA-configuration data; and
an authentication device configured to:
  transmit a challenge message to the FPGA and receive a response message to the challenge message, wherein the response message is generated, at the FPGA, by encrypting the challenge message, wherein the response message includes a third MAC value generated by the cryptographic algorithm using the challenge message and the second MAC value as a second initial value; and
  authenticate the response message by comparing the third MAC value to a fourth MAC value.

6. The system of claim 5 further comprising a memory arranged to store the FPGA-configuration data.

* * * * *